(12) United States Patent
Lee et al.

(10) Patent No.: US 10,922,290 B2
(45) Date of Patent: Feb. 16, 2021

(54) METHOD AND APPARATUS FOR ORGANIZING DATABASE SYSTEM IN A CLOUD ENVIRONMENT

(71) Applicant: TMAX CLOUD CO., LTD., Seongnam-si (KR)

(72) Inventors: Eungyu Lee, Seongnam-si (KR); Sangeun Nam, Yongin-si (KR)

(73) Assignee: TMAX CLOUD CO., LTD., Seongnam-si (KR)

( * ) Notice: Subject to any disclaimer, the term of this patent is extended or adjusted under 35 U.S.C. 154(b) by 392 days.

(21) Appl. No.: 15/853,375

(22) Filed: Dec. 22, 2017

(65) Prior Publication Data

US 2018/0181600 A1 Jun. 28, 2018

(30) Foreign Application Priority Data

Dec. 28, 2016 (KR) .......................... 10-2016-0181108

(51) Int. Cl.
| | | |
|---|---|---|
| *G06F 16/30* | (2019.01) | |
| *G06F 16/21* | (2019.01) | |
| *G06F 3/06* | (2006.01) | |
| *G06F 16/27* | (2019.01) | |

(52) U.S. Cl.
CPC ............ *G06F 16/219* (2019.01); *G06F 3/067* (2013.01); *G06F 3/0631* (2013.01); *G06F 16/27* (2019.01)

(58) Field of Classification Search
CPC ............................... G06F 16/27; G06F 3/0631
See application file for complete search history.

(56) References Cited

U.S. PATENT DOCUMENTS

| | | | |
|---|---|---|---|
| 9,384,209 B2 | 7/2016 | Kim et al. | |
| 2011/0066796 A1 | 3/2011 | Eilert et al. | |
| 2011/0295986 A1* | 12/2011 | Ferris ................... | G06F 9/5072 709/222 |
| 2012/0005341 A1* | 1/2012 | Seago ................... | G06F 9/5072 709/225 |
| 2013/0191527 A1* | 7/2013 | Ashok ................ | H04L 67/1031 709/224 |
| 2014/0270178 A1* | 9/2014 | Kiang .................... | H04L 63/10 380/281 |
| 2015/0134797 A1 | 5/2015 | Theimer et al. | |

(Continued)

FOREIGN PATENT DOCUMENTS

| | | |
|---|---|---|
| JP | 2015-115059 A | 6/2015 |
| KR | 10-2011-0028212 A | 3/2011 |

(Continued)

*Primary Examiner* — Mahesh H Dwivedi
(74) *Attorney, Agent, or Firm* — Novick, Kim & Lee, PLLC; Sang Ho Lee

(57) ABSTRACT

A method for organizing database system in a cloud environment is disclosed. The method comprises selecting, in response to a received database service request, a storage node appropriate to the request from a plurality of storage nodes in the cloud environment, building a storage server corresponding to an instance for processing an I/O stream of the requested database on the selected storage node; managing, by a database manager, information including the database service request and the built storage server as meta information, and organizing, by a computing node, a database system responding to the request based on the meta information.

13 Claims, 5 Drawing Sheets

(56) References Cited

U.S. PATENT DOCUMENTS

2015/0172204 A1     6/2015   Anderson et al.
2015/0296030 A1* 10/2015   Maes .................... G06F 9/5072
                                                                                       715/736
2016/0191309 A1*   6/2016   Yang .................. H04L 41/0806
                                                                                       709/222
2019/0303127 A1* 10/2019   Krishnaswamy ......... G06F 8/65

FOREIGN PATENT DOCUMENTS

| KR | 10-2014-0010428 | 1/2014 |
| KR | 10-2014-0074608 A | 6/2014 |
| KR | 10-2015-0102388 A | 9/2015 |
| KR | 10-2015-0124001 A | 11/2015 |
| KR | 10-1612297 B1 | 4/2016 |
| KR | 10-2016-0136489 A | 11/2016 |
| WO | 2012/139061 A2 | 10/2012 |

* cited by examiner

METHOD AND APPARATUS FOR ORGANIZING DATABASE SYSTEM IN A CLOUD ENVIRONMENT

CROSS-REFERENCE TO RELATED APPLICATIONS

This application claims the benefit under 35 U.S.C. § 119 of a Korean Patent Application No. 10-2016-0181108 filed Dec. 28, 2016, in the Korean Intellectual Property Office, the entire contents of which are hereby incorporated by reference.

BACKGROUND

The present disclosure relates to a method and apparatus for organizing database system in a cloud environment.

As input/output (I/O) streams are not separated for the currently used database system, it is organized for only a single host or for pre-determined hosts among a plurality of hosts using different network protocols.

When building a database system that sends and receives I/O streams based on a single host in a cloud environment, users have the advantage of being able to select the database according to their preferences when additional patches are provided or a new version of the database is upgraded. However, in order to improve the performance of the database, for example, to improve the bandwidth of the I/O stream, it is necessary to provide high-performance hardware. As a result, it takes a lot of cost to improve the performance of the database. In addition, on the position of the administrator, dualization in the host unit is difficult, and it depends only on the hardware performance of the host, which limits the availability and scalability of the database system.

In the case of using different network protocols in parallel processing of the I/O streams of the database service for a large number of hosts, performance overheads are caused due to the use of the network protocols. In addition, when the network protocol is used, the host cannot distinguish the database for each user, so that the bandwidth between the I/O streams cannot be guaranteed. Moreover, achieving quality of service (QoS) and data isolation between companies (tenants) or between respective users belonging to the company (tenant) become difficult, thereby leading to an imbalance of storage resources.

Furthermore, when using a different network protocol for each host, a different design is required depending on the characteristics of the network protocol. For example, when processing an I/O stream using iscsI (Internet Small Computer Systems Interface) protocol that directly uses the storage of a host, it is necessary to ensure the usable capacity so that each database is not duplicated and additional design is required to determine whether to allow data access for each database. Also, when using NFSv4 or SMB protocol used for access on a file system unit basis, account for each I/O stream and the accessible file management system design thereof are required.

SUMMARY

An aspect of the present disclosure is to provide a method and apparatus for organizing a database system for processing I/O streams in parallel, which can distinguish I/O streams of a database without using a separate network protocol in a cloud environment.

An aspect of the present disclosure is to provide a method and apparatus for organizing a database by performing resource allocation for parallel processing of I/O streams for each user and each tenant.

An aspect of the present disclosure is to provide a method and apparatus for organizing a database system that facilitates design expansion of a database through additional I/O stream allocation since I/O streams are processed in parallel.

In accordance with an aspect of the present disclosure, a method for organizing database system in a cloud environment is provided. The method may include selecting, in response to a received database service request, a storage node appropriate to the request from a plurality of storage nodes in the cloud environment, building a storage server corresponding to an instance for processing an input/output (I/O) stream of the requested database on the selected storage node, managing, by a database manager, information including the database service request and the built storage server as meta information, and organizing, by a computing node, a database system responding to the request based on the meta information, In an embodiment, the database service request may include size and type information on the database to be built and user information.

In an embodiment, the method for organizing database system in a cloud environment may comprise determining if a database appropriate to the database service request has been built based on the user information.

In an embodiment, the method for organizing database system in a cloud environment may comprise directly receiving the meta information from the database manager and providing the database system when the database appropriate to the service request has already been built.

In an embodiment, the method for organizing database system in a cloud environment may comprise performing per-tenant and per-user identification based on the user information, and allocating, by the storage server, data or bandwidth for each user.

In an embodiment, the building the storage server may include sharing a storage server image with other objects accessing the storage server by loading a storage server image on the selected storage nodes.

In an embodiment, the organizing, by a computing node, a database system may include the step of receiving meta information from the database manager and connecting to the selected storage server.

In accordance with an aspect of the present disclosure, a program stored on a storage medium for executing a method according to various embodiments of the present disclosure is provided.

In accordance with an aspect of the present disclosure, a computer readable storage medium storing a program for executing a method according to various embodiments of the present disclosure is provided.

In accordance with an aspect of the present disclosure, a computing server for organizing database system in a cloud environment is provided. The computing server may include a master node and a computing node. The master node is configured to select, in response to a received database service request, a storage node appropriate to the request from a plurality of storage nodes in the cloud environment, build a storage server corresponding to an instance for processing an I/O stream of the requested database on the selected storage node, and manage, by a database manager, information including the database service request and the built storage server as meta information. The computing node is configured to organize the database system responding to the request based on the meta information.

In an embodiment, the computing server may further comprise the storage node connected to the computing node and configured to store the I/O stream.

In an embodiment, the storage node may manage and share a storage server image.

In an embodiment, the database service request may include size and type information on the database to be built and user information, the user information includes pertenant and per-user identification, and the storage server may allocate data or bandwidth for each user.

According to the method and apparatus for organizing a database system according to the present disclosure, since a database system organization is flexibly provided for a user's database service request in a cloud environment, a database system having high performance, availability, and expandability can be organized.

According to the present disclosure, it is possible to provide a method and apparatus for organizing a database system in which several versions of databases and I/O stream instances are configured in the form of a cloud virtual images so that a database desired by a user can be easily organized and deleted.

According to the present disclosure, since a database system is executed separately from an I/O stream, it is possible to provide a method and apparatus for organizing a database system not requiring additional design for database operation.

According to the present disclosure, there is provided a method and apparatus for organizing a database system capable of flexibly responding to a user's request such as a performance improvement of a database, a storage space expansion, or additional I/O stream request by utilizing an extra host in a cloud environment.

According to the present disclosure, since a plurality of instances share a cloud virtual image through software provisioning, the copying process can be reduced when the same cloud virtual image is required while organizing a database system selected by a user, thereby providing a method and apparatus for organizing a database system that enables quick operation.

BRIEF DESCRIPTION OF THE FIGURES

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Hereinafter, various embodiments of the present disclosure may be described in detail with reference to the accompanying drawings. The same denotations refer to the same elements on drawings in the specification, and a description by the same elements may be omitted.

The specific structural or functional description is merely illustrative for the purpose of describing embodiments of the present disclosure with respect to various embodiments of the present disclosure disclosed herein. Various embodiments of the present disclosure may be implemented in various forms, and may not be construed as limited to the embodiments set forth herein.

Expressions such as "$1^{st}$", "$2^{nd}$" "first" and "second" used in various embodiments may be used to refer to various elements regardless of the order and/or the priority, but the above elements should not be restricted to the above expressions. For instance, the first element may be named the second element, and vice versa, without departing the scope of claims of the present disclosure.

The terms used in the specification are intended to describe certain embodiments only, and should by no means restrict the scope of another embodiment. Unless clearly used otherwise, expressions in a singular form include a meaning of a plural form.

All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of this disclosure. In some cases, even if terms are terms which are defined in the present disclosure, they may not be interpreted to exclude embodiments of the present disclosure.

Figure 1:
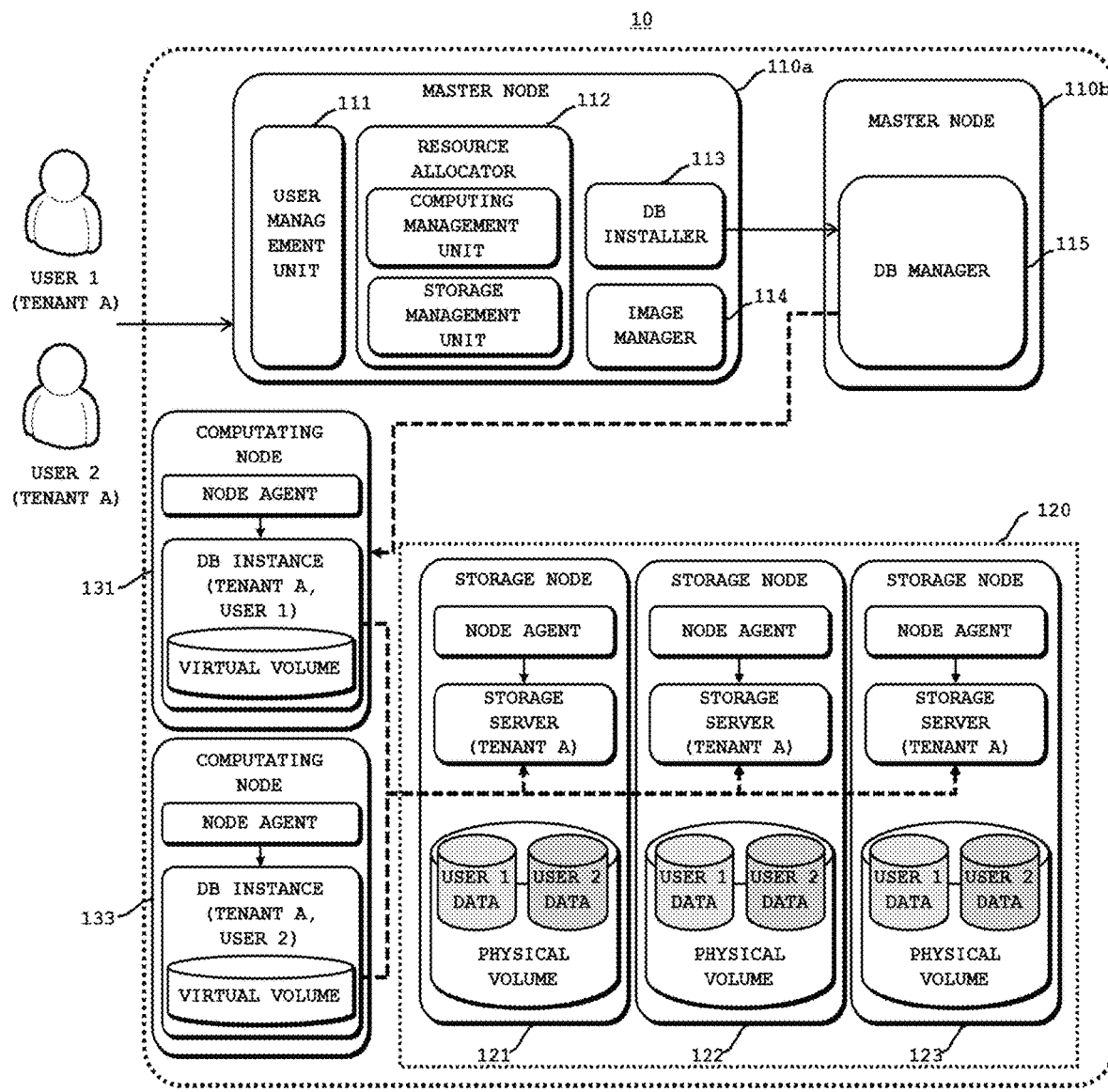
FIG. 1 is a diagram illustration a configuration of a computing server for organizing a database system according to an embodiment of the present disclosure.

FIG. 1 is a diagram illustration a configuration of a computing server for organizing a database system according to an embodiment of the present disclosure.

Referring to FIG. 1, the computing server 10 may include a plurality of components that perform various functions in a cloud environment. The computing server 10 receives information including version and function of the database selected by a user using a user interface provided through the cloud environment. The user can select the version and function of the desired database using a computing device capable of network communication. For example, information input by the user may include information such as the performance associated with the operation, such as the central processing unit or memory of the database, the performance associated with the storage, such as the size or type of storage, version, and etc.

Information on the version and function of the database selected by the user may be managed by the user management unit 111 in the master node 110a. According to various embodiments, information such as performance and version related to the database may be managed for each user and each tenant. For example, there may be a various users in a particular enterprise, that is, tenant, and storage resources such as bandwidth and data may be differently distributed to the users within one tenant. Accordingly, the user management unit 111 may manage the performance related to the database, the version, and the bandwidth and data information for each tenant and each user.

Upon receiving the database service request from the user, the computing server 10 determines whether the currently received database service request can be satisfied using the I/O stream system which has already been built by the user. When the performance of the database service request can be satisfied by using the existing I/O stream system, it is possible to reduce the labor for building the database system for executing the database I/O stream requested by the user, thus enabling faster service response.

When the existing I/O stream system cannot satisfy the performance of the database service request requested by the user, a new I/O stream system should be built to support this performance.

In order to build an I/O stream system dynamically in a cloud environment, two aspects of hardware and software should be considered. The computing server 10 according to an embodiment of the present disclosure may be configured such that the resource allocator 112 in the master node 110a is responsible for building the hardware system and the image manager 114 is responsible for building the software.

The resource allocator 112 selects storage nodes to build the requested I/O stream system. The resource allocator 112 may select the storage node based on the storage type, size and space of the requested database. The type of storage may include various types of storage such as volatile memory, non-volatile memory, etc., and a storage node with a sufficient amount of storage space may be selected according to the requested storage size. Depending on the embodiment, the resource allocator 112 may select a plurality of storage nodes 121, 122, 123 to form a storage group 120 for parallel processing and considering failover of database I/O streams. For example, at least three storage nodes may be selected to form the storage group 120. In addition, the resource allocator 112 may select a storage node according to the database performance desired by the user.

The image manager 114 creates a cloud virtual image of an instance desired by the user through software provisioning, or distributes the already stored virtual image to a specific node so that the instance can be operated on that node. In the case of building an I/O stream system according to a user's request, the image manager 114 builds and loads instances that process I/O streams, that is, the storage server to the storage nodes 121, 122, and 123 selected by the resource allocator 112.

In a cloud environment in which the computing server 10 operates according to an embodiment of the present disclosure, various instances are shared and executed through software provisioning technology. Therefore, when the same instance occurs in the future, it is possible to omit the step of copying the virtual image, thereby reducing the overhead due to the copying of the virtual image.

Once the database I/O stream system is built, a database install operation can be performed to load the database that will use the I/O stream. In the database installation process, the database installer 113 transmits information about the database (DB ID) and information with regard to the I/O output stream instances to the database manager 115, and the database manager 115 manages the meta information associated with the database and may provide meta information to the computing nodes 131 and 133 when the database is executed in the future.

In the cloud environment, the database manager 115 manages information for all databases in order to support the performance and management of the database. For example, when expanding the database space, the database manager 115 determines the capacity of all the databases used in the existing storage nodes and determines whether or not to allocate additional storage nodes. Accordingly, the database manager 115 should manage the information on the whole database. The database manager 115 manages the meta information of all the databases being executed in the cloud environment and can determine the capacity of all the databases being executed in the existing storage node to determine whether to allocate the additional storage nodes.

After transferring the database system information to the database manager 115, the resource allocator 112 selects the computing nodes that can build the database system with the performance desired by the user. The image manager 114 builds a database image selected by the user in the selected computing node and executes the database system by loading the corresponding database instance.

It can be seen in FIG. 1 that different computing nodes 131 and 133 are selected for the first user and the second user included in the same tenant, respectively, and different database instances are also loaded. Even within the same tenant, different database environments can be built depending on the users. However, it is merely an embodiment what is shown in FIG. 1, and one computing node may be assigned to one tenant Also inside the storage node, the first user and the second user use different physical volumes, and such data can be managed in the storage server of the storage node. Also, the bandwidths of the I/O streams of the respective users can be set differently.

The executed database system may be provided with database system information (for example, address (IP) of the I/O stream, metadata of the virtual volume, etc.) from the database manager 115 and may be finally provided to the user in connection with the I/O stream.

Figure 2:
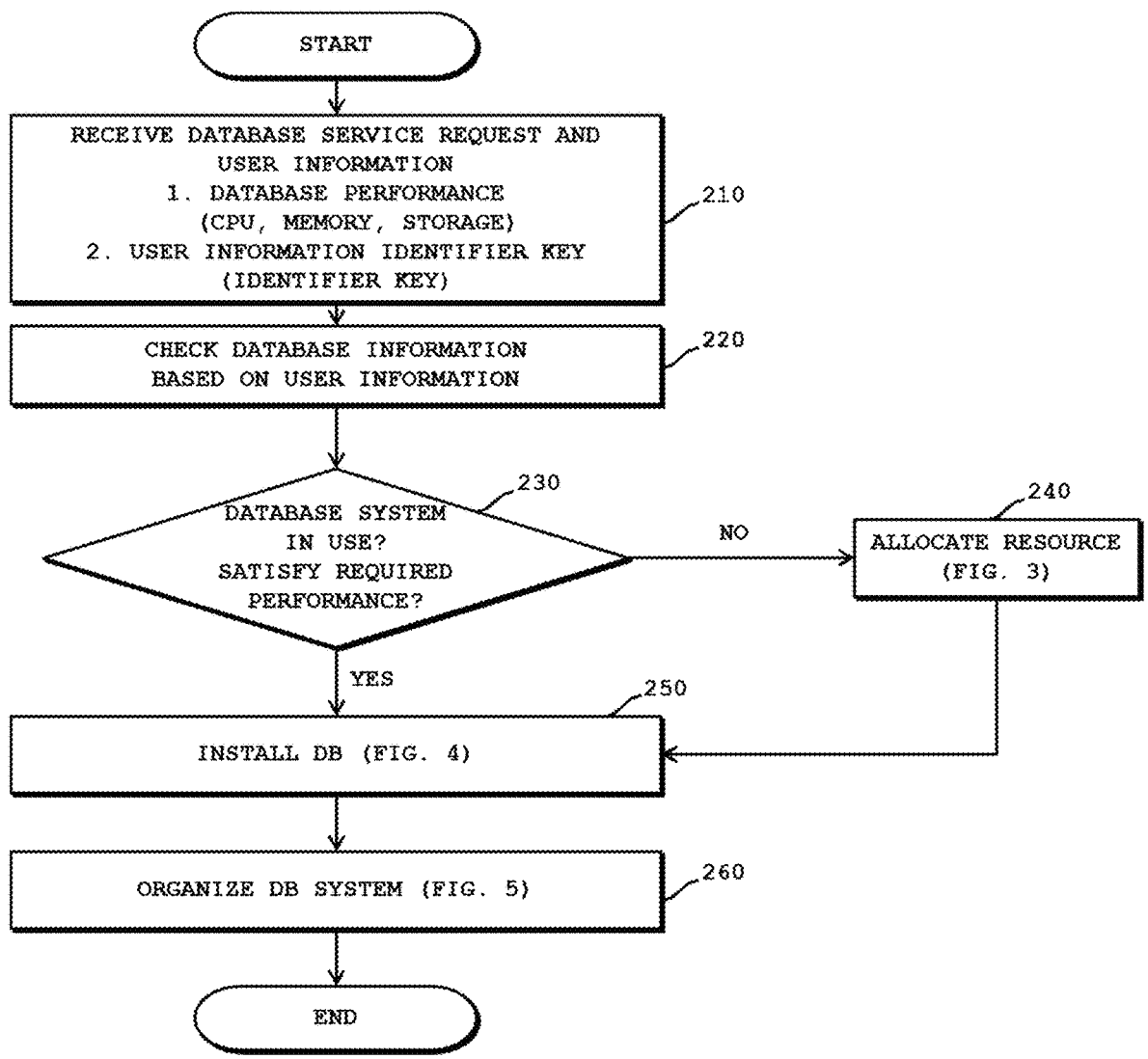
FIG. 2 is a flowchart illustrating a method of building a database system in a cloud environment according to an embodiment of the present disclosure.

FIG. 2 is a flowchart illustrating a method of building a database system in a cloud environment according to an embodiment of the present disclosure.

Referring to FIG. 2, a user requests a database service by selecting a type and performance (for example, a central processing unit, memory, storage) of a database to be used through a cloud user interface. The computing server 10 receives the user's database service request and user information (step 210). The user information may include a user information identification key. As described above, when the user belongs to a specific tenant, the user information may include the corresponding tenant information as well as the user's personal information.

The user management unit 111 of the computing server 10 checks the database information based on the user information (step 220). Specifically, the user management unit 111 determines whether there is a database system in use and whether there is a database system satisfying the performance of the current service request among the database systems in use, by checking the database list used by the user.

When there is no database system satisfying the current request among the already built database systems (step 230, No), resource allocation is performed (step 240) to organize a new database system.

When there is a database system satisfying the database system request of the current user among the already built database systems (step 230, YES), the resource allocation for building the I/O stream system is not requested, and the database installation is directly performed (step 250). After the database installation is performed, the computing node that received the meta information from the database manager 115 is connected to the I/O stream, so that a database system is organized and provided to the user (step 260).

Figure 3:
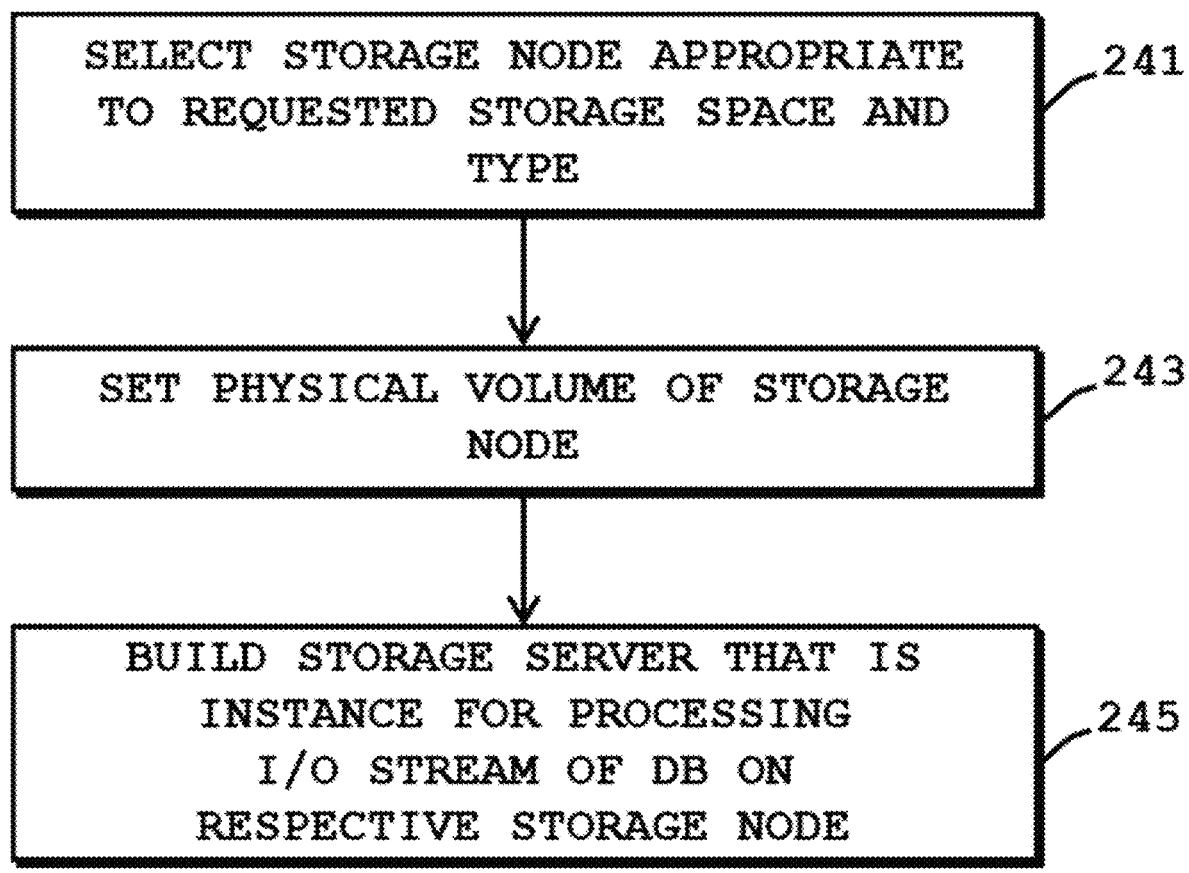
FIG. 3 is a diagram for explaining a resource allocation process for organizing a database system according to an embodiment of the present disclosure.

FIG. 3 is a diagram for explaining a resource allocation process for organizing a database system according to an embodiment of the present disclosure.

Referring to FIG. 3, the storage node appropriate to the storage space necessary for the request and the requested storage type is selected based on the database service request requested by the user (step 241). This selection may be performed by the resource allocator 112. As described above, the resource allocator 112 can select a plurality of storage nodes. In addition, the resource allocator 112 can set a physical volume in the selected storage node to secure storage space required for a database service request requested by the user (step 243). According to various embodiments, the resource allocator 112 may allocate different data and bandwidths to other users in the same tenant to be managed by the storage server.

The image manager 114 may build a storage server image on the storage nodes selected by the resource allocator 112. The resource allocator 112 may communicate with the node agent in the storage node to build the storage server image (step 245). The storage server image is set to be shared with the instance requesting the same image in the cloud environment, so that it is possible to shorten the time required for building the system when another user's database I/O stream system is built in the same node in the future.

When the storage node is selected through the resource allocation, the database is installed to organize the database system requested by the user.

Figure 4:
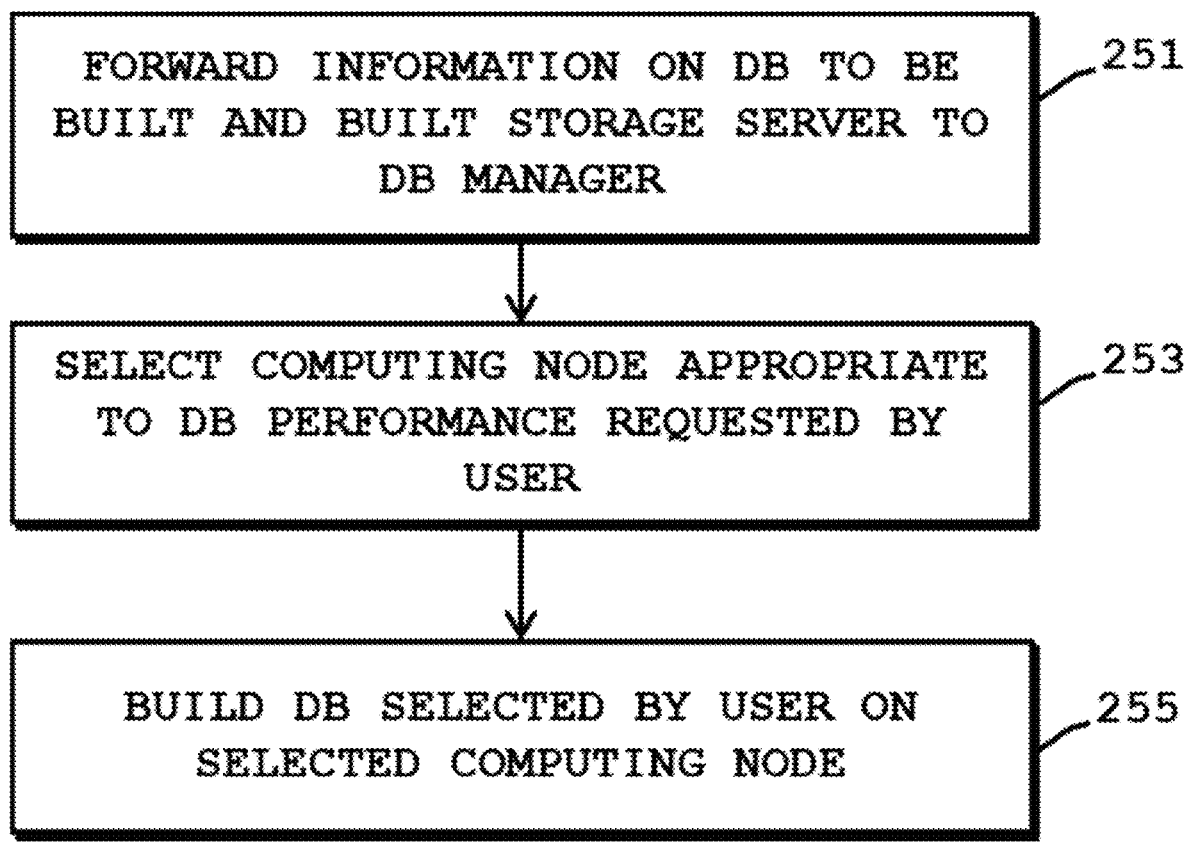
FIG. 4 is a flowchart illustrating a database installation process for organizing a database system according to an embodiment of the present disclosure.

FIG. 4 is a flowchart illustrating a database installation process for organizing a database system according to an embodiment of the present disclosure.

Referring to FIG. 4, information regarding the database to be built and the built storage server is transferred to the database manager 115 (step 251). The database manager 115 manages the meta information of the database and the storage server to manage and support the corresponding database. The database manager 115 manages meta information of all the databases executed in the cloud environment and may support the execution of databases by extension, disaster recovery, and the like.

The resource allocator 112 selects a computing node appropriate to the performance of the database requested by the user (step 253), and the image manager 114 loads the database image of the version requested by the user in the selected computing node to complete the database installation (Step 255).

Figure 5:
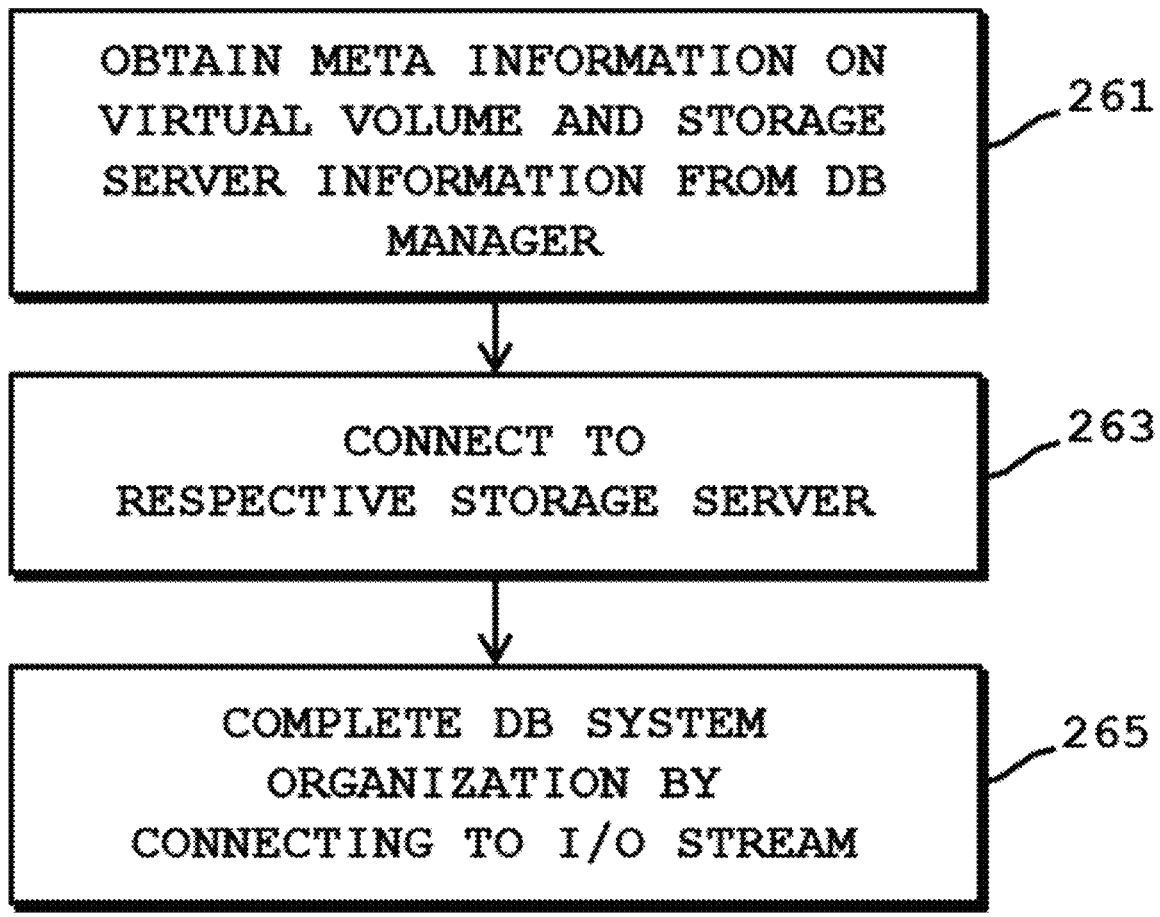
FIG. 5 is a flowchart for explaining a database system organization according to an embodiment of the present disclosure.

FIG. 5 is a flowchart for explaining a database system organization according to an embodiment of the present disclosure.

Referring to FIG. 5, computing nodes 131 and 133 obtain the meta information for the virtual volume and the storage server information from the database manager 115 (step 261). The computing nodes 131 and 133 connect to each storage server based on the obtained storage server information (step 263). Thus, the compute nodes 131 and 133 are connected to the storage server and connected to the I/O stream to organize a database system that enables parallel I/O streams (step 265).

Various embodiments of the present disclosure may be implemented in hardware, firmware, software, or a combination of at least one of them. Various embodiments of the present disclosure may be implemented with instructions stored on a computer-readable storage medium that can be read and executed by one or more processors. A computer-readable storage medium is a physical medium for storing information, and may include volatile memory, non-volatile memory, optical storage medium, magnetic disk storage medium, and the like. Also, various embodiments of the present disclosure may include a computer-readable recording medium having instructions for performing the above-described methods recorded thereon.

Methods and apparatuses for organizing database system according to various embodiments of the present disclosure can manage and expand various databases in various ways by separately executing a database and an I/O stream. Also, I/O streams can be processed in parallel, so that I/O to and from a large number of hosts can be performed freely and the scalability is high.

The present invention has been described in detail with reference to the preferred embodiments shown in the drawings. It is to be understood that these embodiments are exemplary rather than limiting, and should be considered in an illustrative rather than a restrictive sense. The true scope of protection of the present invention should be determined by the technical idea of the appended claims rather than the above description. Although specific terms have been used herein, they are used for purposes of describing the concept of the invention only and are not used to limit the scope of the invention as defined in the claims. Each step of the present invention need not necessarily be performed in the order described, but may be performed in parallel, selectively, or individually.

It will be understood by those skilled in the art that various modifications and equivalent other embodiments are possible without departing from the spirit and scope of the invention as defined by the appended claims. It is to be understood that the equivalents include all components that are invented in order to perform the same function irrespective of the currently known equivalents as well as the equivalents to be developed in the future.

While the inventive concept has been described with reference to embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A method for organizing a database system in a cloud environment, the method comprising:
receiving a database service request;
determining whether there is a database system in use satisfying the database service request;
when there is a database system in use satisfying the database service request, performing a database installation process for the database system in use;
when there is no database system in use satisfying the database service request, performing a resource allocation process including:
selecting, by a resource allocator, a storage node based on a storage type and a storage size of the requested database,
creating, by an image manager, a cloud virtual image of an instance desired by a user through software provisioning to distribute the cloud virtual image to a specific storage node so that the instance can be operated on that node, and
building, by the resource allocator, a storage server corresponding to an instance for processing an input/output (I/O) stream of the requested database on the selected storage node;

managing, by a database manager, information on the database service request and the built storage server as meta information; and organizing, by a computing node, a new database system responding to the database service request based on the meta information.

2. The method of claim 1, wherein the database service request includes size and type information on the database to be built and user information.

3. The method of claim 2, further comprising:

determining if a database appropriate to the database service request has been built based on the user information.

4. The method of claim 3, further comprising:

directly receiving the meta information from the database manager, and providing the database system when the database appropriate to the service request has already been built.

5. The method of claim 2, further comprising:

performing per-tenant and per-user identification based on the user information, and allocating, by the storage server, data or bandwidth for each user.

6. The method of claim 2, wherein the building the storage server includes, sharing a storage server image with other objects accessing the storage server by loading a storage server image on the selected storage nodes.

7. The method of claim 2, wherein the organizing the new database system includes, receiving the meta information from the database manager and connecting to a selected storage server.

8. A non-transitory computer readable storage medium storing a program for executing a method of claim 1 by a computer.

9. A computing server for organizing a database system in a cloud environment, the computing server comprising:

a master node configured to:

receive a database service request;

determine whether there is a database system in use satisfying the database service request;

when there is a database system in use satisfying the database service request, perform a database installation process for the database system in use;

when there is no database system in use satisfying the database service request, perform a resource allocation process including:

selecting, by a resource allocator, a storage node based on a storage type and a storage size of the requested database, creating, by an image manager, a cloud virtual image of an instance desired by a user through software provisioning to distribute the cloud virtual image to a specific storage node so that the instance can be operated on that node, and building, by the resource allocator, a storage server corresponding to an instance for processing an input/output (I/O) stream of the requested database on the selected storage node; and manage, by a database manager, information on the database service request and the built storage server as meta information; and a computing node configured to organize a new database system responding to the request based on the meta information.

10. The computing server of claim 9, wherein the storage node is connected to the computing node and configured to store the I/O stream.

11. The computing server of claim 10, wherein the storage node manages and shares a storage server image.

12. The computing server of claim 9, wherein the database service request includes size and type information regarding the database to be built and user information.

13. The computing server of claim 12, wherein the user information includes per-tenant and per-user identification and the storage server allocates data or bandwidth for each user.

* * * * *